Patented Apr. 19, 1938

2,114,696

UNITED STATES PATENT OFFICE 2,114,696

PROCESS OF PRODUCING PHTHALIDE

Paul Rolland Austin and Francis John McCall, Wilmington, Del., assignors to E. I. du Pont de Nemours & Company, Wilmington, Del., a corporation of Delaware No Drawing. Application March 30, 1935, Serial No. 13,910

8 Claims. (Cl. 260—123)

This invention relates to a catalytic process for the preparation of phthalide.

Phthalic anhydride has been hydrogenated over nickel catalysts by several investigators. Godchot (Bull. Soc. Chem. (4) 1, 829 (1907)) noted the production of phthalide when phthalic anhydride was hydrogenated at 200° C. over nickel. Eijkman (Chem. Weekblat. 4, 191 (1907)) similarly noted the production of phthalide under these conditions. In 1918 Willstätter and Jaquet (Ber. 51, 767 (1918)) carried out the hydrogenation of phthalic anhydride, using a platinum catalyst, and noted in addition to phthalide the production of appreciable quantities of hexahydrophthalide, hexahydro-o-toluic acid and hexahydrophthalic acid. German Patent 368,414 (1923) to Lucius and Bruning discloses the hydrogenation of phthalic anhydride with nickel at 190° C. using as solvents tetrahydro-napthalene, cyclohexanol, naphthalene or phthalide. The production of by-products is not noted. This patent also discloses the hydrogenation of tetrachlorophthalic anhydride to tetrachlorophthalide.

This invention has as an object a new process for the catalytic hydrogenation of anhydrides of dibasic acids to the corresponding lactones. A further object of this invention is to develop an improved process for the manufacture of phthalide. A still further object of the invention is to discover the most suitable solvents for the catalytic hydrogenation of phthalic anhydride to phthalide.

It has been found that phthalic anhydride may be smoothly hydrogenated with nickel catalysts to give good yields of phthalide when lower monohydric aliphatic alcohols are utilized as solvents for the reaction.

The method developed for the preparation of phthalide consists in charging an autoclave, suitably equipped for agitation, with phthalic anhydride, the prescribed solvent, and nickel catalyst, suitably a freshly reduced nickel-on-kieselguhr catalyst or other highly active nickel catalysts, as will be described hereinafter. Hydrogen is introduced into the autoclave until the pressure reaches the prescribed point and it is then maintained at this point for the duration of the run, while heat is applied as indicated. At the completion of the run the mixture is filtered to remove the catalyst and, if necessary, benzene is added to facilitate the filtration. Water soluble solvents (ethanol) are evaporated and replaced by benzene. Water insoluble solvents are supplemented with benzene. The benzene solution is then washed with a 10% sodium carbonate solution until neutral. The carbonate solution is separated and acidified to give the acidic material, o-toluic acid or hexahydro-o-toluic acid. Alternatively, the toluic acids may be removed by saturating the benzene solution with ammonia gas and filtering off the insoluble ammonium toluate that is formed. Pure phthalide is recovered by evaporation of the organic solvent.

A catalyst suitable for the hydrogenation of phthalic anhydride or equivalent anhydrides may be prepared from the elements in the ferrous group of metals, i. e., iron, cobalt, or nickel. This is the preferred group of elements from a practical standpoint although suitable catalysts may be prepared also from copper, cadmium or tin, either alone or in combination with chromium oxide. The following examples will serve to show the manner used in preparing a suitable catalyst, the catalytic element in this case being nickel.

A quantity of metallic nickel was dissolved in a mixture of equal parts by weight of 70% nitric acid and water. The solution was filtered and diluted with water to approximately twice its original volume. To the mixture was then added a quantity of kieselguhr weighing 10% more than the original nickel used. A solution of sodium bicarbonate (approximately 6% strength) was added to the nickel nitrate-kieselguhr mixture with vigorous stirring and in sufficient quantity to precipitate all of the nickel. The resulting precipitate was washed thoroughly with cold water, filtered, dried and reduced with hydrogen at 450° C.

Catalyst supports other than kieselguhr may be used, for example, carbon, alumina, magnesia, charcoal, pumice, asbestos, or quartz. The free metal itself may be used with no supporting material, although such a catalyst, unless specially prepared, is liable to be less durable.

A preferred nickel catalyst is prepared by digesting a nickel-aluminum alloy with sodium hydroxide according to the Raney method as described in U. S. Patent 1,628,190.

The processes of the present invention are illustrated by the following examples:

Example I

One hundred forty-eight grams of phthalic anhydride, 46 g. of absolute ethanol, and 14.8 g. of nickel-on-kieselguhr catalyst were charged into an autoclave as described above and the mixture was heated at 140° to 160° C. with agitation under 1000 to 1500 pounds per square inch hydrogen pressure. The reaction was complete in 2 hours. The alcoholic solution was filtered to remove the catalyst and the alcohol was removed by distillation with steam. The residue was dissolved in benzene and extracted with 10% aqueous sodium carbonate solution until neutral. On evaporation of the benzene solution there was obtained 97 g. of phthalide (72.4% of theoretical). The carbonate solution was acidified and yielded 27.5 g. of o-toluic acid (16.5% of theoretical).

*Example II*

One hundred forty-eight grams of phthalic anhydride, 50 g. of absolute ethanol, and 15 g. of nickel catalyst (Raney catalyst), prepared by extracting a powdered nickel-aluminum alloy with sodium hydroxide, was hydrogenated at 140° to 160° C. under a hydrogen pressure of 1500 to 2500 pounds per square inch. Benzene was added and the catalyst was filtered. The solution was then evaporated and again taken up in benzene. The benzene solution was extracted with aqueous sodium carbonate solution until neutral and the products isolated as described in Example I. There was thus obtained 98 g. of phthalide (73.0% of theoretical), 10 g. of hexahydrophthalide (7.1% of theoretical), and 14 g. of o-toluic acid (10.3% of theoretical).

In the above examples, certain definite conditions of operation such as time, temperature and pressure have been indicated, but these may be varied within wide limits within the scope of the present invention. The preferred temperature for the process is the range from 100° to 200° C., but the temperatures above and below this may be used, although not so efficiently.

The preferred pressure for the process of the present invention lies within the range of 400 to 5000 pounds per square inch, but pressures of 1000 to 1500 pounds per square inch are usually the most suitable. The time of reaction is determined by the rate at which hydrogen is absorbed, which rate will vary depending on the temperature, pressure, catalyst, and anhydride being hydrogenated. An excess of hydrogen is usually employed. It may vary to as high as 1000% excess.

Although in the examples a liquid phase operation is disclosed, the invention is not limited to these conditions. Thus the process may be employed either in the liquid or in the vapor phase and may be operated either as a batch or a continuous process.

In the examples absolute ethanol is disclosed as a solvent but other solvents for the hydrogenation may be used; for example, we may use the lower monohydric aliphatic alcohols, especially those having less than 6 carbon atoms such as n-propanol, isopropanol, n-butanol, isobutanol, or any of the isomeric pentanols.

The examples disclose the hydrogenation of phthalic anhydride, but other anhydrides represented by the general anhydride formula

may be hydrogenated to corresponding lactones

where R in the above formula may be aromatic such as phenyl or naphthyl, or aliphatic such as $(CH_2)_n$, where $n$ equals 2, 3, or 4, or R may be a cycloalkyl ring as illustrated by cyclohexyl and cyclopentyl in hexahydrophthalic and camphor anhydrides. Thus hexahydrophthalic anhydride gives hexahydrophthalide. Furthermore, when R is aromatic this nucleus may contain other substituent groups as, for example, alkyl groups exemplified by anhydrides of 3- and 4-methyl-o-phthalic and 3,6-di-methylphthalic acids which would give the corresponding methylated phthalides. While we prefer to use anhydrides of the above general formula in which the parent carboxyl groups of the anhydride are attached to adjacent carbon atoms in the R group, as in the anhydrides of o-phthalic and hexahydro-o-phthalic acids, we may also use certain anhydrides in which the parent carboxyls are not in adjacent positions, as in camphoric anhydride and 1,8-naphthalic anhydride.

Certain anhydrides of dibasic acids, when heated, form the anhydride readily at temperatures within the temperature range indicated for the hydrogenation of the anhydride. In such cases the hydrogenation of the acids themselves may be carried out in lieu of the anhydride and the process is to be regarded as falling within the scope of the invention.

Phthalide and substituted phthalides are of interest generally as plasticizers. They are of further interest as intermediates in the preparation of dyes, pharmaceuticals, parasiticides, plasticizers and resins.

When one considers the prior art, it is easily seen that two definite positions are extant: Either the investigator has claimed a quantitative yield of phthalide or else he has found the reaction to be complex with a number of products formed in addition to phthalide. Among these by-products we may mention o-toluic acid, hexahydrophthalide, hexahydro-o-toluic acid, and toluene. Repetition of experiments supposed to give quantitative yields of phthalide has shown that actually only low yields (30 to 50%) of this material are produced; o-toluic acid and phthalic acid are the chief by-products. These findings are corroborated by those investigators who have attempted to isolate all of the products of the reaction. However, if one uses as a solvent for the reaction the lower monohydric aliphatic alcohols, phthalide is produced in a good yield (65 to 75% of theoretical), and the only by-product obtained is o-toluic acid. Furthermore, the use of these solvents allows the ready separation and isolation of the product formed. Other advantages of this invention are found in the relatively low temperature and low pressure at which the hydrogenation may be carried out, which obviates the necessity of using the special equipment necessary to produce and maintain extremely high temperatures and pressures.

At the temperature required for the hydrogenation described in the processes of this invention the alcohol reacts with phthalic anhydride to form a monoalkyl hydrogen phthalate, which intermediate is then hydrogenated to phthalide. In one modification of our invention we may hydrogenate externally prepared alkyl hydrogen phthalates wherein the alkyl group is derived from a monohydric aliphatic alcohol containing less than six carbon atoms. Specifically, we may hydrogenate methyl hydrogen phthalate, ethyl hydrogen phthalate, propyl or iso-propyl hydrogen phthalate, or any of the isomeric butyl or amyl hydrogen phthalates.

As many apparently widely different embodiments of this invention may be made without departing from the spirit and scope thereof, it is to be understood that the invention is not limited

We claim:

1. The process of producing phthalide from phthalic anhydride which comprises catalytically reacting hydrogen and phthalic anhydride in the presence of a lower monohydric aliphatic alcohol, said reaction being carried out in the liquid phase and at a temperature between about 100° C. and about 200° C.

2. The process of producing phthalide from phthalic anhydride which comprises catalytically reacting hydrogen and phthalic anhydride in the presence of a lower monohydric aliphatic alcohol having less than 6 carbon atoms, said reaction being carried out in the liquid phase and at a temperature between about 100° C. and about 200° C.

3. The process of producing phthalide from phthalic anhydride which comprises reacting hydrogen and phthalic anhydride in the presence of ethanol, said reaction being carried out in the liquid phase and at a temperature between about 100° C. and about 200° C.

4. The process of producing phthalide from phthalic anhydride which comprises reacting phthalic anhydride dissolved in ethanol with hydrogen in the presence of a nickel catalyst under a pressure of 400 to 5000 pounds per square inch and at a temperature of 100° to 200° C.

5. The process of producing phthalide from phthalic anhydride which comprises reacting phthalic anhydride dissolved in ethanol with hydrogen in the presence of a nickel catalyst under a pressure of 1500 to 2500 pounds per square inch and at a temperature of 140° to 160° C.

6. The process which comprises catalytically hydrogenating in the liquid phase, at a temperature between about 150° C. and about 200° C., a lower alkyl mono ester of phthalic acid to phthalide.

7. The process in accordance with claim 6 characterized in that the ester is in solution in a lower monohydric aliphatic alcohol.

8. The process which comprises catalytically hydrogenating in the liquid phase, at a temperature between about 150° C. and about 200° C., the monoethyl ester of phthalic acid to phthalide.

PAUL R. AUSTIN.
FRANCIS J. McCALL.